Sept. 2, 1941.      K. NAKAYAMA      2,254,707
CONTROL OF ELECTRIC SWITCHES
Filed Sept. 11, 1940
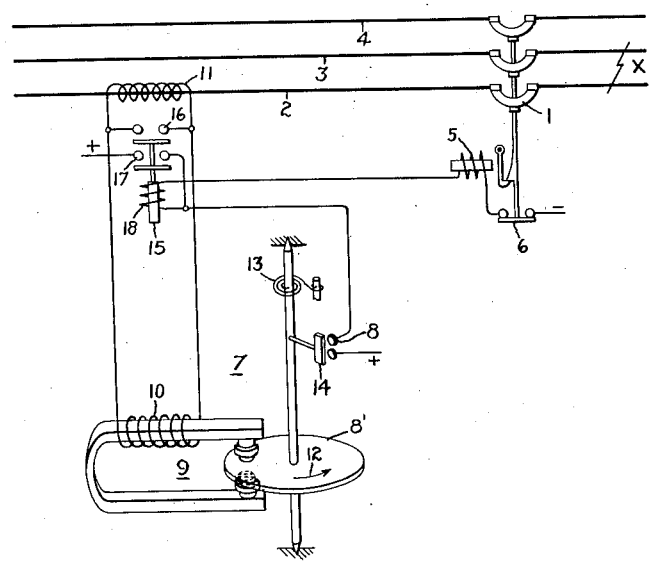
Inventor:
Kenichi Nakayama,
by Harry E Dunham
His Attorney.

Patented Sept. 2, 1941

2,254,707

UNITED STATES PATENT OFFICE 2,254,707

CONTROL OF ELECTRIC SWITCHES

Kenichi Nakayama, Yokohama, Japan, assignor to General Electric Company, a corporation of New York Application September 11, 1940, Serial No. 356,345
In Japan December 18, 1939

7 Claims. (Cl. 175—294)

My invention relates to improvements in the control of electric switches and more particularly circuit breakers whose opening is effected by apparatus responsive to predetermined abnormal circuit conditions and whose reclosing operation it is desired to initiate during the opening operation of the circut breaker.

It has been found that most of the abnormal conditions which occur on electric circuits disappear so quickly that service may be restored soon enough to prevent any appreciable interference with the operation of synchronous apparatus. Accordingly there have been devised so-called instantaneous reclosing circuit breaker arrangements. These are sometimes referred to as fractional stroke reclosing circuit breakers since the reclosing operation is started before the completion of the opening movement of the circuit breaker but only after sufficient contact separation to insure arc interruption. Inasmuch as the circuit breaker controlling apparatus, which responds to the abnormal circuit conditions to effect the opening operation of the circuit breaker, tends to maintain its opening control position until the circuit is interrupted, the reclosing operation may be delayed or rendered ineffective by failure of the control apparatus to assume its normal condition soon enough. Thus, for example, the contacts of a current energized fault responsive relay, closing to energize a circuit breaker trip coil, will not tend to open until the arc is interrupted. Consequently the resetting of the relay is delayed by the circuit breaker opening time, and a quick circuit breaker reclosure is likely to be followed by an unnecessary opening action.

One object of my invention is to provide a control arrangement for opening circuit breakers such that the resetting of the abnormal condition responsive apparatus is advanced by substantially the circuit breaker circuit opening time whereby to prevent a false reopening after a reclosure. This and other objects of my invention will appear in more detail hereinafter.

In accordance with my invention, I provide a circuit breaker opening control arrangement comprising an abnormal circuit condition responsive apparatus such as a fault responsive protective relay which, immediately following its initiating operation to open the circuit breaker, is rendered ineffective or deenergized so as to reset or return to its normal condition without the delay involved in the actual circuit interruption.

My invention will be better understood from the following description when considered in connection with the accompanying drawing, and its scope will be pointed out in the appended claims.

The single figure of the accompanying drawing diagrammatically illustrates an embodiment of my invention as applied to the opening control of a circuit breaker 1 in a polyphase circuit comprising phase conductors 2, 3 and 4. As shown, the circuit breaker 1 is of the latched closed type and is provided with suitable opening means illustrated simply as a trip coil 5 and also an $a$ auxiliary switch 6 in series with the trip coil.

For initiating the opening operation of the circuit breaker 1, suitable abnormal circuit condition responsive means, such as a fault responsive relay 7, is provided. As shown, this is an overcurrent relay having contacts 8 which are arranged in series in the circuit of the trip coil 5 and are closed in response to the appearance in the phase conductor 2 of a current exceeding a predetermined value. Also, as shown, the relay 7 is of the shaded pole induction disk type comprising a rotatable disk 8' of electric current conducting material actuated by a shaded pole motor element 9 comprising an energizing winding 10. This can be energized in any suitable manner as, for example, through a current transformer 11 in the phase conductor 2. Actuation of the disk 8' in the direction indicated by the arrow 12 tends to effect the closing of the contacts 8 against the bias of suitable re-setting means, such as a spring 13. As is well known to the art, a relay may be provided for each phase to take care of phase-to-phase faults and also a residual current relay to take care of ground faults. Also, as far as my invention is concerned, the particular type of fault responsive relay used is immaterial.

Since it is frequently desired to start the reclosing operation of a circuit breaker before the completion of the opening stroke, I arrange, in accordance with my invention, to render the relay ineffective to maintain the opening operation condition immediately following the initiation of this opening operation so that a quick reclosing may be accomplished without danger of unnecessary reopenings. For this purpose I may, as shown in the drawing, effectively deenergize the relay 7 quickly after it completes the circuit of the trip coil 5 through the closing of its contacts 8 by the circuit controlling member 14 which moves with the disk 12. To accomplish this, I employ means dependent on the fault responsive operation of the relay. Such means may be energized responsively to the circuit closing operation of the contacts 8. As shown, this means is a fast acting auxiliary relay 15 which, upon operation, is arranged to render the protective relay ineffective so that it can reset independently of the circuit condition to which it responded. Thus the auxiliary relay 15 may comprise contacts 16 which, as shown, short-circuit the energizing winding 10 of the protective relay. When this occurs, the disk 8' is free to reset to the normal circuit position under the bias of the spring 13 regardless of whether or not the circuit has been opened at the circuit breaker 1.

However, since it is important to insure the completion of the tripping operation, I also provide means to insure the completion of this operation. As shown, this may be done by providing the auxiliary relay 15 with circuit closing contacts 17 which are arranged in series with the winding 18 of the auxiliary relay and the trip coil 5 so as to maintain the energization of the auxiliary relay and the trip coil until the circuit breaker 1 opens its auxiliary switch 6.

Assuming the parts positioned as shown and that a fault occurs between the phase conductors 2 and 3, as indicated by the line X, then, if the current flow in the phase conductor 2 exceeds that for which the protective relay 7 is set to operate, this relay will close its contacts 8 to effect the energization of the auxiliary relay 15 and the trip coil 5 whereby to initiate the opening operation of the circuit breaker 1. With the operation of the auxiliary relay 18, this relay seals itself in through its contacts 17 to maintain its own circuit as well as the circuit of the trip coil 5. At the same time, through its contacts 16, the winding 10 of the protective relay 7 is short-circuited so that this relay is free to reset independently of the condition of the circuit controlled by the circuit breaker 1. In consequence thereof, the relay returns to the condition which it occupies under normal circuit conditions so that a quick reclosing action of the circuit breaker 1 will not find this relay with its contacts in tripping or closed position or so near to this position that any surge of current attendant upon the closing of the breaker will cause the closing of the contacts and an unnecessary opening of the circuit breaker. In other words, the protective relay merely initiates the opening operation of the circuit breaker and is then permitted to reset during such operation without awaiting the final circuit interruption before being able to start to reset.

Since arrangements for the so-called instantaneous or fractional stroke reclosing of circuit breakers are well known to the art and since they form no part of my invention, I have omitted any showing thereof for simplicity in understanding the novel features of my invention.

While I have shown and described my invention in considerable detail, I do not desire to be limited to the exact arrangement shown, but seek to cover in the appended claims all those modifications that fall within the true spirit and scope of my invention.

What I claim as new and desire to secure by Letters Patent of the United States, is:

1. An arrangement for effecting the opening of an electric circuit in response to an abnormal condition thereof comprising a circuit breaker, means for initiating the opening operation of the circuit breaker comprising a device responsive to abnormal conditions of the circuit controlled by the circuit breaker, and means responsive to the operation of the device for quickly rendering the device itself ineffective to maintain the circuit breaker opening operation.

2. An arrangement for effecting the opening of an electric circuit in response to an abnormal condition thereof comprising a circuit breaker, means for initiating the opening operation of the circuit breaker comprsing a device responsive to abnormal conditions of the circuit controlled by the circuit breaker, means responsive to the operation of the device for quickly rendering the device itself ineffective to maintain the circuit breaker opening operation, and means for insuring a completion of the circuit breaker opening operation.

3. An arrangement for effecting the opening of an electric circuit in response to an abnormal condition thereof comprising a circuit breaker, means for initiating the opening operation of the circuit breaker comprising a device responsive to abnormal conditions of the circuit controlled by the circuit breaker, and means responsive to the operation of the device for quickly rendering the device itself ineffective to maintain the circuit breaker opening operation including means for insuring a completion of the circuit breaker opening operation.

4. An arrangement for effecting the opening of an electric circuit in response to an abnormal condition thereof comprising a circuit breaker, means for initiating the opening operation of the circuit breaker comprising a fault responsive protective relay connected to be energized from the circuit controlled by the circuit breaker, and means including an auxiliary relay controlled by said protective relay for effecting the deenergization of the protective relay prior to the completion of the circuit interrupting operation of the circuit breaker.

5. An arrangement for effecting the opening of an electric circuit in response to an abnormal condition thereof comprising a circuit breaker, means for initiating the opening operation of the circuit breaker comprising a fault responsive protective relay connected to be energized from the circuit controlled by the circuit breaker, and means including an auxiliary relay controlled by said protective relay for effecting the deenergization of the protective relay prior to the completion of the circuit interrupting operation of the circuit breaker and for insuring a completion of the opening operation of the circuit breaker.

6. An arrangement for effecting the opening of an electric circuit in response to an abnormal condition thereof comprising a circuit breaker, means for initiating the opening operation of the circuit breaker comprising a fault responsive protective relay having a winding connected to be energized in accordance with an electric quantity of the circuit, and means dependent on the fault responsive operation of said relay for effecting the resetting of the relay independently of the removal of the abnormal condition during the opening operation of the circuit breaker.

7. An arrangement for effecting the opening of an electric circuit in response to an abnormal condition thereof comprising a circuit breaker, means for initiating the opening operation of the circuit breaker comprising a fault responsive protective relay having a winding connected to be energized in accordance with an electric quantity of the circuit, means dependent on the fault responsive operation of said relay for effecting the resetting of the relay independently of the removal of the abnormal condition during the opening operation of the circuit breaker, and means for insuring a completion of the opening operation of the circuit breaker.

KENICHI NAKAYAMA.